United States Patent [19]

Arnold

[11] Patent Number: 5,240,301
[45] Date of Patent: Aug. 31, 1993

[54] BED LINER HAVING INTEGRAL CARGO RESTRAINT CAPABILITY

[76] Inventor: Richard E. Arnold, 3268 Warick, Royal Oak, Mich. 48072

[21] Appl. No.: 951,726

[22] Filed: Sep. 25, 1992

Related U.S. Application Data

[63] Continuation of Ser. No. 293,825, Jan. 5, 1989, abandoned.

[51] Int. Cl.$^5$ .......................... B62D 33/02; B60P 1/64
[52] U.S. Cl. .................................. 296/39.2; 410/129; 220/533
[58] Field of Search .............. 296/39.2, 39.1; 410/129, 130, 146; 220/530, 532, 533; 224/42.42

[56] References Cited

U.S. PATENT DOCUMENTS

| | | | |
|---|---|---|---|
| D. 271,009 | 10/1983 | Fishler | 296/39.2 X |
| 604,730 | 5/1898 | Core | 296/52 X |
| 2,985,333 | 5/1961 | Kirkman | 220/22.3 |
| 4,245,863 | 1/1981 | Carter | 296/39.2 |
| 4,253,785 | 3/1981 | Bronstein | 410/110 |
| 4,278,376 | 7/1981 | Hunter | 410/130 |
| 4,333,678 | 6/1982 | Munoz et al. | 296/39.2 |
| 4,507,033 | 3/1985 | Boyd | 410/104 |
| 4,717,298 | 1/1988 | Bott | 410/129 |
| 4,750,776 | 6/1988 | Barben | 296/39.2 |
| 4,767,149 | 8/1988 | Rye | 296/39.2 |
| 4,887,947 | 12/1989 | Bott | 296/39.2 X |

FOREIGN PATENT DOCUMENTS 156411  3/1969  France .......................... 220/22.3

OTHER PUBLICATIONS

Martec Plastics, "Martector", Dated 1991.

*Primary Examiner*—Dennis H. Pedder
*Attorney, Agent, or Firm*—Brooks & Kushman

[57] ABSTRACT

A bed liner for pick-up trucks incorporating the features of multi-component construction, releasable connection with the side-walls, and an integral, nonintrusive cargo restraint capability. Specifically, the bed liner is composed of a durable, resilient material with individual panels for each longitudinal side-wall, floor, front wall and tail gate of the pick-up truck bed. The bed liner panels are secured to the pick-up truck bed by a releasable system, such as VELCRO, which is a registered trademark for a hook and loop fastener system. Each interior surface of the bed liner panel is provided with a series of regularly spaced, vertically oriented grooves. Cargo restraint is achieved by selectively inserting a planar retaining member, such as a predetermined number of stacked 2×4's, into opposing grooves on opposite sides of the bed. This may be either longitudinal between the front wall and the tailgate, or transverse between the side-walls.

12 Claims, 4 Drawing Sheets

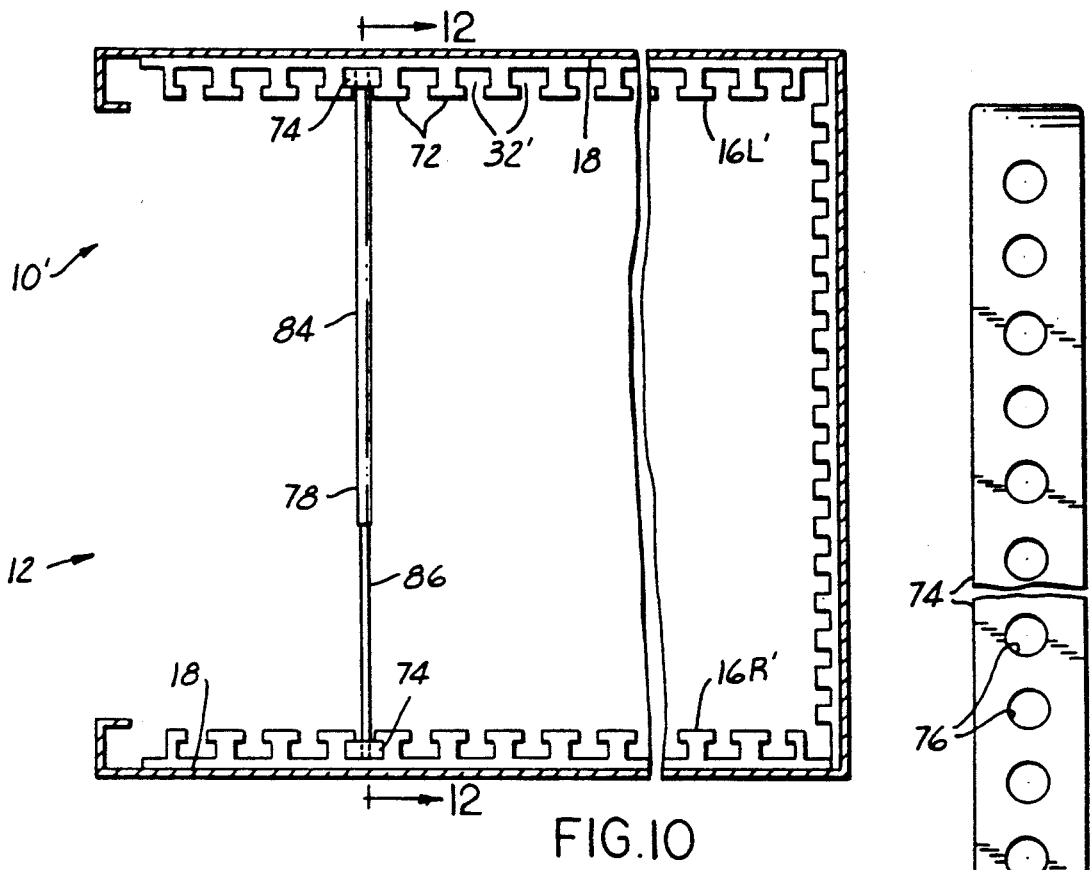
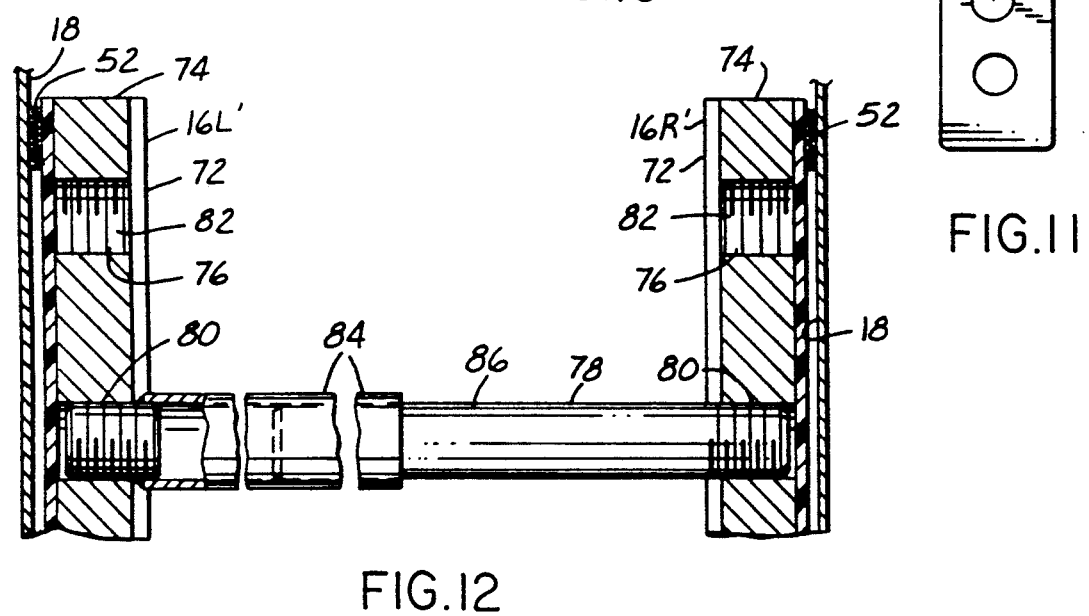

BED LINER HAVING INTEGRAL CARGO RESTRAINT CAPABILITY

This is a continuation of copending application Ser. No. 07/293,825 filed on Jan. 5,1989, now abandoned.

BACKGROUND OF THE INVENTION

1. Field of the Invention

The present invention relates to bed liners of the kind now commonly used for the beds of pick-up trucks, and more particularly to a bed liner having provision for selectively restraining cargo at predetermined locations in the bed.

2. Description of the Prior Art

Bed liners have been developed primarily to solve the problem of wear-and-tear damage to the bed of pick-up trucks. These bed liners are typically made of a rubber type material and are structured to cover the floor and side-walls of the bed. The theory of operation is that by covering the otherwise exposed surfaces of the bed with a thick, resilient material, then abrasion of the painted surface of the metal will be eliminated and denting will be minimized.

In the prior art these are proposed various bed liner structures directed to solving the aforesaid wear-and-tear problems associated with the beds of pick-up trucks. The following are examples of such structures. U.S. Pat. No. 4,245,863 dated Jan. 20, 1981 to Carter discloses a pick-up truck bed liner having a resilient core and is attachable to the bed side-walls by releasable means, such as a dual lock fastening system. U.S. Pat. No. 4,333,678 dated Jun. 8, 1982 to Munoz et al discloses a multiple piece bed liner, composed of pieces for each side-wall and the floor, so as to facilitate easy-to-handle shipment to end users.

A further important problem associated with the use of beds of pick-up trucks is that original equipment manufacturers do not provide for means of securing cargo in the bed. Consequently, the user of the vehicle is generally left without remedy when his cargo is slidable or otherwise movable on the bed floor. It is well known that stops and turns exert potentially enormous inertial forces on the cargo which can have disastrous effect if the cargo is allowed to shift unchecked in the pick-up truck bed.

In the prior art these are proposed various structures directed to solving the aforesaid cargo restraint problems associated with the beds of pick-up trucks. The following are examples of such structures. U.S. Pat. No. 4,253,785 dated Mar. 3, 1981 to Bronstein discloses an edge protector on the longitudinal side-walls of the bed and tabs thereon for securing a rope which laces across the bed. U.S. Pat. No. 4,278,376 dated Jul. 14, 1981 to Hunter discloses a longitudinally adjustable cargo restraint system in which a transverse board may be selectively clamped along longitudinal rails attached to the floor of the bed. U.S. Pat. No. 4,507,033 dated Mar. 26, 1985 to Boyd discloses a load securing apparatus for a pick-up truck bed having a longitudinally adjustable clamping system located on the top of the longitudinal side-walls which cooperates with a transversely oriented board located in the bed. Finally, U.S. Pat. No. 4,717,298 dated Jan. 5, 1988 to Bott discloses a cargo restraint system for pick-up trucks utilizing a pair of longitudinal adjustable clamping devices attached to the bed floor; or, alternatively, to the floor panel of a bed liner. A transverse board in the bed cooperates with the clamping devices.

In each of the cargo restraint devices enumerated above, there remains a host of problems. The device of Bronstein only secures loads in the vertical dimension. The devices of Hunter, Boyd and Bott each utilize expensive longitudinal clamping devices which are subject to binding because components must be slid along rails. Indeed, the devices of Boyd and Bott suffer additionally from the fact that their rails must intrude into the bed from the floor, thereby being subject to damage from loads or, possibly even worse, themselves damaging delicate cargo since the floor is not level wherever the rails are located.

It would be particularly desirable to provide a combination of a bed liner having all the advantages outlined above with an inexpensive, fully functional cargo restraint system. Although Bott alludes to the concept of utilizing a bed liner in combination with a cargo restraint system, his vision suffers from the problem of the impracticality of locating a longitudinal clamping system intrusively on the bed floor. Accordingly, what is needed is a bed liner which incorporates a cargo restraint system which does not suffer from any of the aforesaid problems encountered in prior art solutions.

SUMMARY OF THE INVENTION

The present invention is a bed liner for pick-up trucks incorporating the features of multi-component construction, releasable connection with the side-walls, and an integral, nonintrusive cargo restraint capability.

Specifically, the present invention is a bed liner composed of a durable material and is assembled of individual panels for each longitudinal side-wall, floor, front wall and tail gate of the pick-up truck bed. The bed liner panels are secured to the pick-up truck bed by a releasable system, such as a dual lock fastening system. Each interior surface of the bed liner panel is provided with a series of regularly spaced, vertically oriented grooves.

Cargo restraint is achieved via the present invention by selectively inserting a retainer member of planar shape, such as a predetermined number of stacked 2×4's, into opposing grooves on opposite sides of the bed. This may be either longitudinal between the front wall and the tailgate, or transverse between the side-walls. It is further possible to place a plurality of retainer members at predetermined spaced apart locations in the pick-up truck bed in order to provide precise cargo restraint of a particularly sized load at a predetermined location on the floor of the pick-up truck bed. It is still further possible to connect selectively clampable members onto the plurality of retainer members so as to simultaneously provide transverse and longitudinal securing of the cargo.

While prior art pick-up truck bed liners may show some form of ribs in the wall panels, these are universally for strength and water run off between the bed liner and the side-walls.

Accordingly, it is an object of the present invention to provide a bed liner having an integral cargo restraint system which is not intrusive at the floor.

It is a further object of the present invention to provide a bed liner and integral cargo restraint system which is inexpensive and not subject to binding.

It is yet a further object of the present invention to provide a multi-component bed liner having an integral cargo restraint system.

It is still an additional object of the present invention to provide a bed liner with integral cargo restraint system in which the cargo restraint system permits securing the cargo at selected locations on the floor of the bed of the pick up truck using both longitudinal and transverse restraint.

These and additional objects, features and advantages of the present invention will become clear from the following description of preferred embodiments of the present invention.

BRIEF DESCRIPTION OF THE DRAWINGS

FIG. 10 is a plan view of an alternative embodiment of the bed liner according to the present invention.

FIG. 11 is a frontal view of a securing member according to the alternative embodiment of the bed liner according to the present invention.

FIG. 12 is a side view along lines 12—12 in FIG. 10 showing the attachment of a telescoping retainer to a pair of securing members.

FIG. 13 is a plan view of the bed liner according to the present invention as in FIG. 2, except now a longitudinally oriented retaining member is shown instead of the transversely oriented retaining member of FIG. 2.

DETAILED DESCRIPTION OF THE PREFERRED EMBODIMENTS

Figure 1:
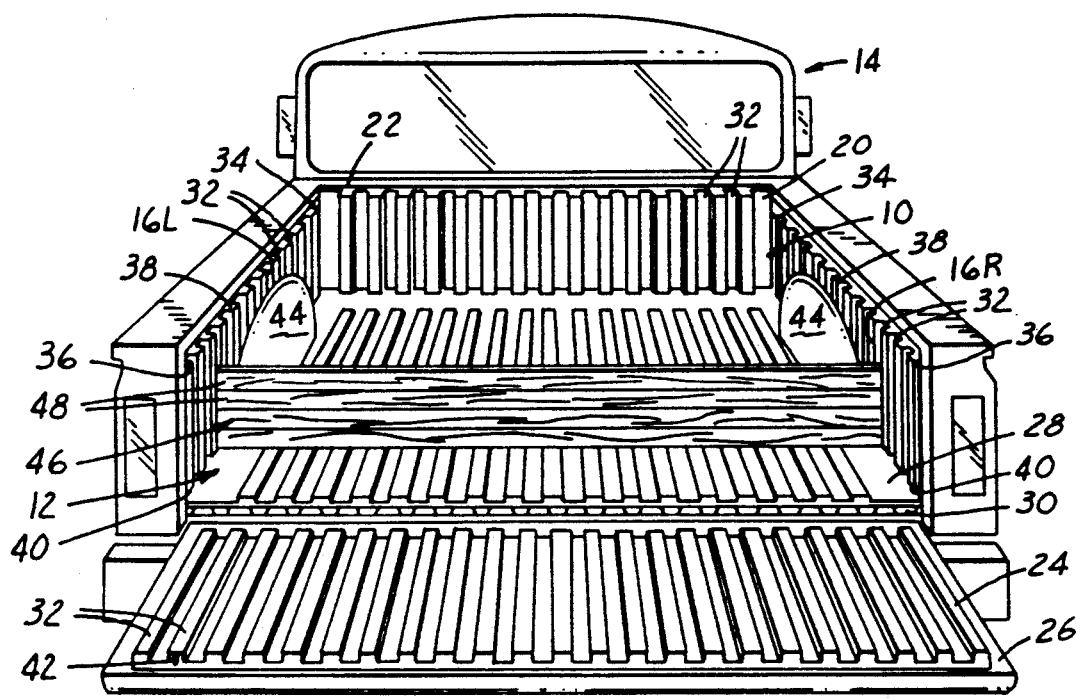
FIG. 1 is a perspective view of the bed liner according to the present invention in operation located in a pick-up truck bed.

Referring now to the figures, FIG. 1 shows the bed liner 10 according to the present invention in operation at the bed 12 of a typical pick-up truck 14. The bed liner 10 is composed of several panels, as follows: side panels 16L and 16R which attach to the side-walls 18 of the bed 12, front panel 20 which attaches at the front wall 22 of the bed 12, tailgate panel 24 which attaches to the tailgate 26 of the bed 12, and, finally, floor panel 28 which attaches to the floor 30 of the bed 12. Each of the side panels 16L and 16R have a plurality of vertically oriented grooves 32, wherein each groove on panel 16L faces an opposite groove on panel 16R. It is preferred that these grooves 32 be equally spaced apart and extend from the front 34 of the side panels to the rear 36 of the side panels. It is further preferred that the grooves extend from the top 38 of the side panels to the bottom 40 of the side panels. It is still further preferred that the grooves 32 be equally spaced apart and be of common dimensionality. Preferably, the grooves 32 have a depth 42 on the order of at least one inch. Further, the front panel 20 and the tailgate panel 24 may also be provided with grooves 32 in the manner aforesaid for the side panels 16L and 16R. It will be seen from FIG. 1 that it is preferred that the grooves 32 on the side panels 16L and 16R not extend over into the area of the wheel wells 44. The bed liner 10 is preferred to be constructed of resilient materials commonly used for prior art bed liners, such as durable rubbers and plastics, but can also be made of durable nonresilient materials. It is preferred that each of the panels 16L, 16R, 20, 24 and 28 be manufactured and shipped as separate components and then assembled on site in the bed 12 to form the bed liner 10. It is to be understood that "bed" 12 refers in its broadest sense to the beds of all forms of utility vehicles, such as pick-up trucks, vans, four wheel drive vehicles, and trailers inclusive of semi-truck trailers; herein a pick-up truck bed is used only by way of example.

Figure 2:
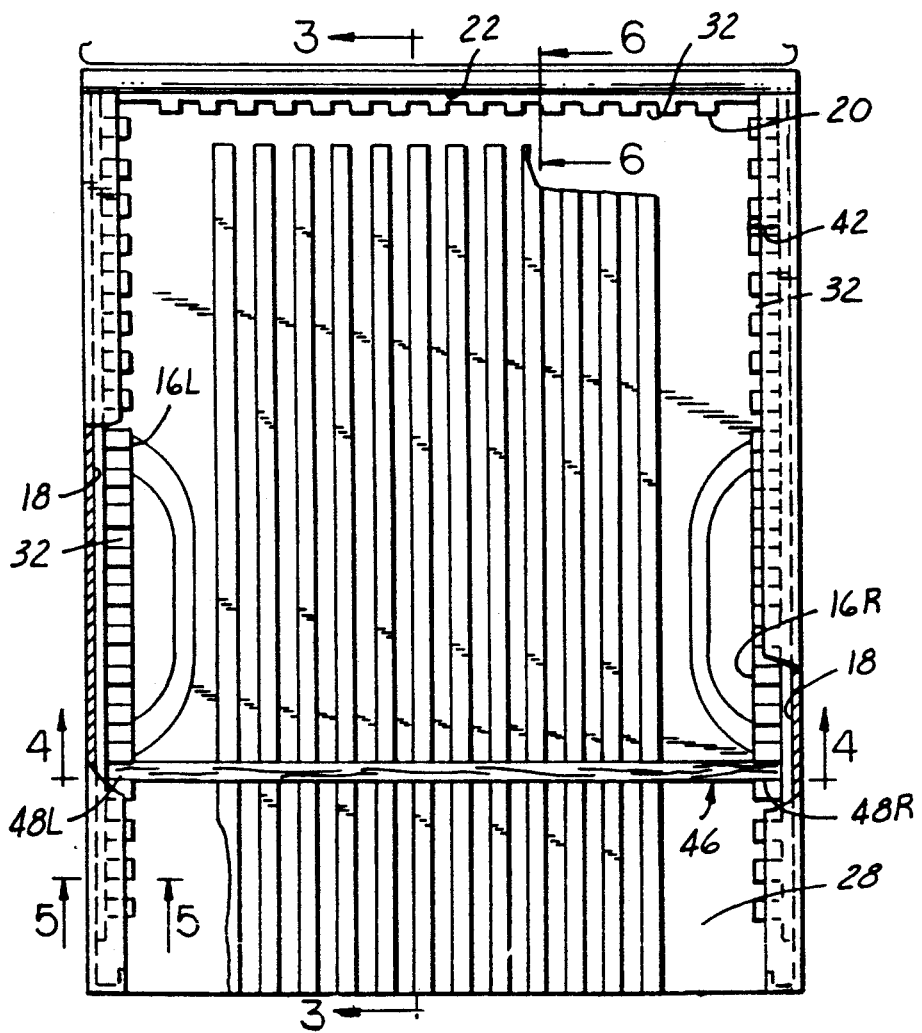
FIG. 2 is a plan view of the bed liner according to the present invention.

It will be seen in FIGS. 1 and 2 that a retainer member 46 is present in the bed 12. The retainer member 46 is preferably composed of a plurality of 2×4's 48 which extend across the bed 12 and insert at each end 48L and 48R in an opposing groove of the side panels 16L and 16R. The height of the retainer member 46 is determined by the number of 2×4's utilized. Further the location of the retainer member 46 is predetermined by the user by selecting grooves 32 which are located appropriately in the bed 12 so that an arbitrarily dimensioned cargo is retainable against the retaining member 46. In order to create a transversely oriented retaining member 46, the user simply vertically drops the retaining member 46 into the selected opposing grooves 32, starting at the top of the panels 38. Some tilting of the retaining member may at first be required in order to clear an overhang on the side-walls (see FIG. 5). Similarly, it is clear that a longitudinally oriented retaining member 46' may be easily created between the front panel 20 and the tailgate panel 24 when these panels are provided with grooves 32.

Figure 3:
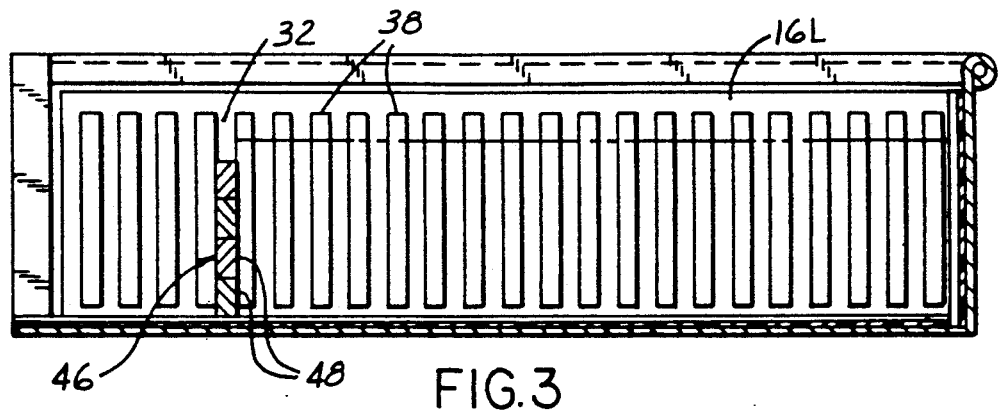
FIG. 3 is a part sectional side view of a bed liner panel according to the present invention along lines 3—3 in FIG. 2.
Figure 4:
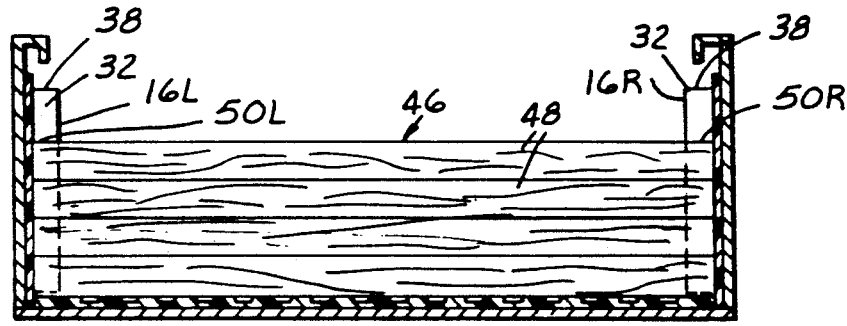
FIG. 4 is a part sectional end view of the present invention along lines 4—4 in FIG. 2.

FIG. 3 shows particularly side panel 16L. It will be seen from FIG. 3 that the 2×4's 48 that compose the retaining member 46 are snuggly fit into the groove 32 and that they may be vertically slid up and out of the groove. While it is preferred that the retaining member 46 fit snuggly into the grooves 32, it is desirable that there be sufficient clearance that the retaining member 46 may be easily slid up and down the grooves 32. FIG. 4 shows particularly that the retaining member 46 is preferred to extend at each end 50L and 50R fully into the grooves 32.

Figure 5:
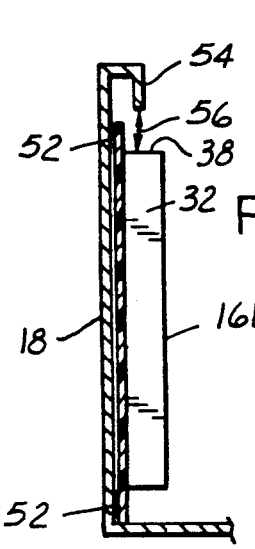
FIG. 5 is a sectional view of the present invention along lines 5—5 in FIG. 2.
Figure 6:
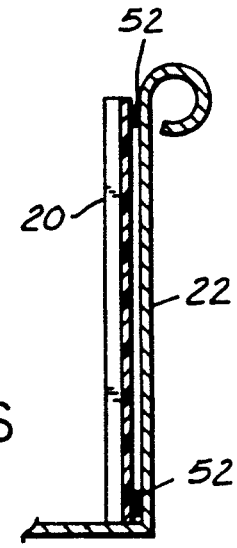
FIG. 6 is a part sectional view of the present invention along lines 6—6 in FIG. 2.
Figure 7:
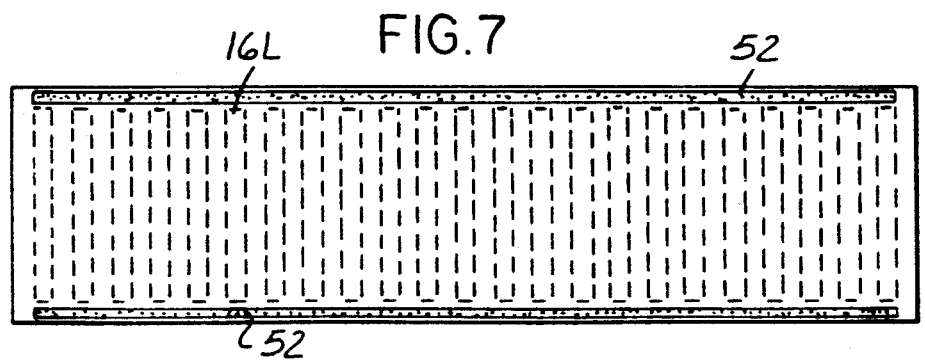
FIG. 7 is a side view of the rear of the bed liner panel shown in FIG. 3.

FIGS. 5 through 7 show how the panels of the bed liner 10 may be attached to the side-walls of the bed 12. FIG. 7 shows a preferred system of attachment utilizing a first portion strip of hook and loop fastening tape 52 gluably attached near the top and bottom of the panels 16L and 16R which is intended to attach to a mating second portion of hook and loop fastening tape gluably attached to the side-walls 18. The front, tailgate and floor panels 20, 24 and 28 may be similarly attached to the bed 12. FIG. 5 shows how the side panels 16L and 16R may be attached to the side-walls 18 of the bed 12. When an overhang 54 is present in the bed 12, it is preferred that a distance of separation 56 be provided between the overhang 54 and the top 38 of the grooves 32 in order to permit insertion of the 2×4's 48 into the grooves. FIG. 6 shows similarly how the front panel 20 is attached to the front wall 22. It is to be understood that the bed liner can be made of multiple pieces or be of one piece construction for all portions except the hinged rear wall (or tailgate).

Figure 8:
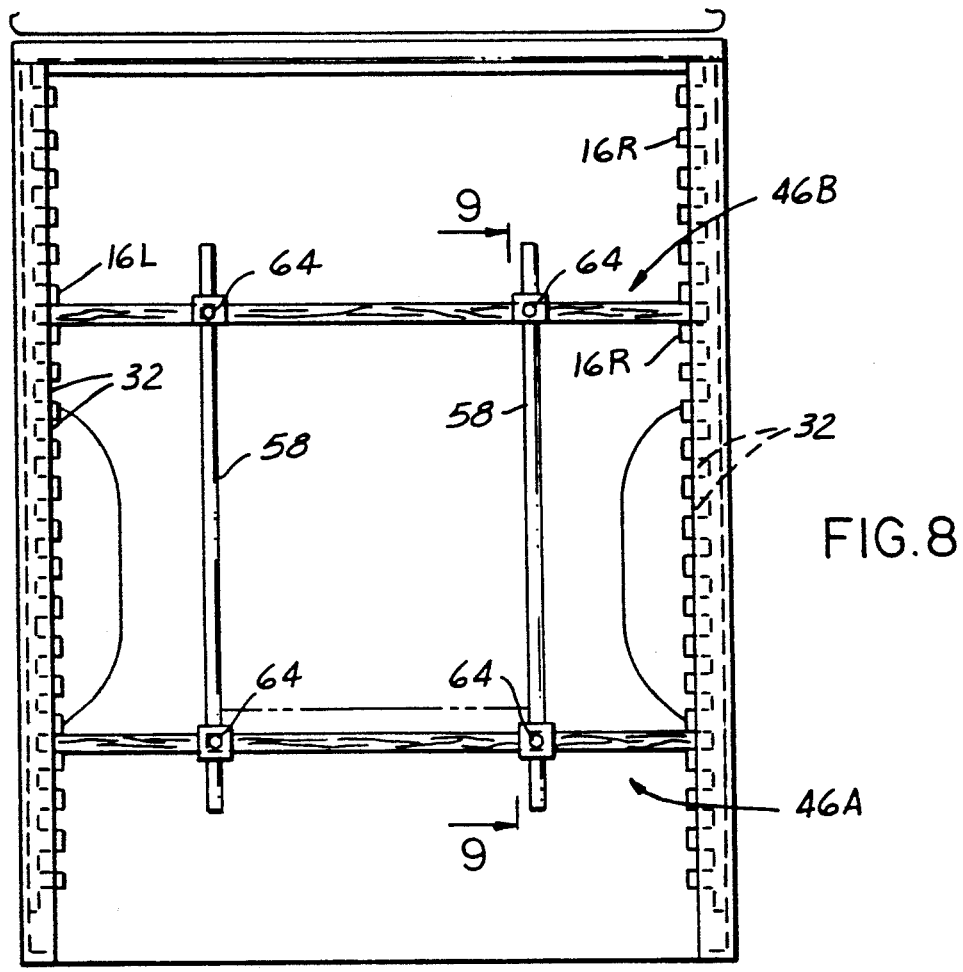
FIG. 8 is a plan view of the bed liner according to the present invention as in FIG. 2, now including longitudinal retaining bars and a pair of transverse retaining members.
Figure 9:
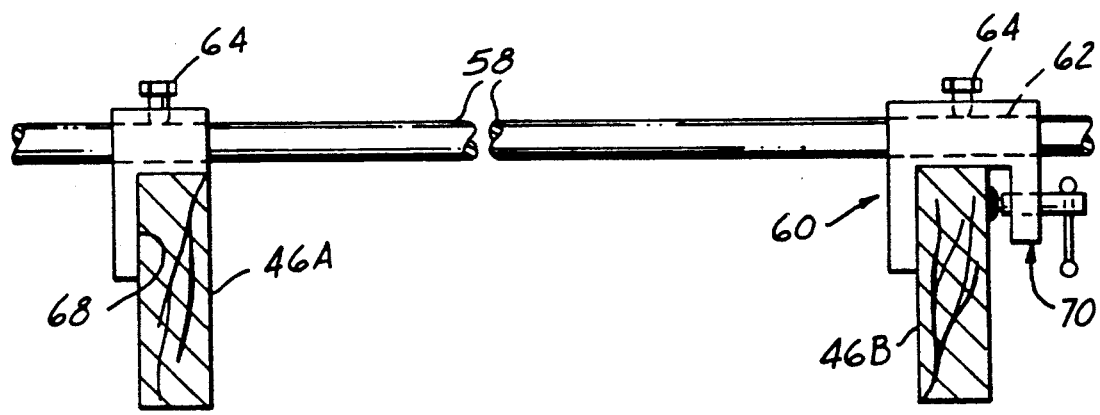
FIG. 9 is a detail side view along lines 9—9 in FIG. 8 of the connection of a retaining bar to a retaining member.

FIGS. 8 and 9 show how cargo may be selectively restrained by the bed liner 10 simultaneously in both the longitudinal and transverse directions. It will be seen in FIG. 8 that there are now two retaining members 46A and 46B. These are oriented transversely in the bed 12, and, as such, prevent cargo from moving in the longitudinal direction. In order to prevent cargo from moving in the transverse direction, one or more retaining bars 58 are utilized. Shown in FIG. 8 are two such retaining bars 58, each attached at each end to a retaining member 46A and 46B. The preferred method of selectively attaching the retaining bars 58 to the retaining members 46 is shown in FIG. 9. A clamp 60 permits selective clamping onto the retaining member 46, while a portion of the clamp has a bore 62 into which the retaining bar 58 inserts and is secured therein by a set screw 64. It is possible to merely have a modified clamp 66 opposite the clamp 60, in which only a shoulder 68 is provided instead of a clamping mechanism 70.

In operation, a user predetermines where in the bed 12 cargo restraint is required. The nearest accessible oppositely facing grooves 32 are then determined and a selected number of 2×4's 48 are placed therein and therebetween so as to constitute a retaining member 46. If necessary, this may be repeated for a second restraining member, and if further necessary, retaining bars may then be clamped thereto as required.

FIGS. 10 through 12 show an alternative embodiment of the bed liner according to the present invention. FIG. 10 is a plan view showing the bed liner 10' in operation in the bed 12. In this alternative embodiment, the side panels 16L' and 16R' have a plurality of modified grooves 32' which are defined by T-shaped members 72. The grooves 32' are vertically oriented and are preferred to be equally spaced apart. Into any groove 32' a securing member 74 may be inserted vertically. Each securing member 74 is structured to snuggly fit into the grooves 32' and the shoulders formed by the T-shaped members 72, and has a plurality of apertures 76 spaced vertically along its length. Again, although a snug fit is preferred, it is desirable for the securing member to be easily slidable up and down the grooves 32'. It is preferred that the securing member be constructed of a non-corrosive material such as aluminum or plastic.

In operation, a user would determine the appropiate location for restraint of the cargo. At the nearest practical, oppositely facing groove 32' in each side panel a securing member 74 is inserted. A telescoping retainer 78 is then connected between oppositely facing apertures 76 in the securing member. This is achieved by having each aperture 76 threaded and the ends of the telescoping retainer threaded as well. As the threaded ends 80 of the telescoping retainer 76 thread onto the threads 82 of the apertures 76, the telescoping retainer may change length by a first portion 84 thereof telescoping in relation to a second portion 86 thereof. Transverse and longitudinal restraint of cargo may be selectively achieved, if desired, in a manner similar to that described above with use of retaining bars.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A multi-piece bed liner for a bed or a pick-up truck, said bed having a floor, a first side wall, a second side wall, a front wall and a rear wall, said first and second side walls having a top and a bottom, a predetermined height and an overhang extending inwardly from said top, said overhang having an underside facing said floor, said multi-piece bed liner cooperating with a transversely orientable retaining member for retaining objects located in said bed, said multi-piece bed liner comprising:

a floor panel for lining said floor;
   a front wall panel for lining said front wall;
   a rear wall panel for lining said rear wall;
   a first side wall panel for lining said first side wall, said first side wall panel having a top edge and a bottom edge, said first side wall panel being dimensioned so that said top edge is adjacent to said underside of said overhang when said bottom edge is adjacent to said floor of said bed, said first side wall panel substantially covering said first side wall below said overhang, said first side wall panel further having a plurality of spaced apart and vertically oriented first grooves, said first grooves being dimensioned to permit a first end of said retaining member to be inserted thereinto, said first grooves extending generally from a location displaced a small distance downwardly from said overhang to a location adjacent to and spaced above said floor panel, said small distance being selected to permit said first end of said retaining member to be inserted into a selected one of said first grooves under said overhang;
   a second side wall panel for lining said second wall, said second side wall panel having a top edge and a bottom edge, said second side wall panel being dimensioned so that said top edge is adjacent to said underside of said overhang when said bottom edge is adjacent to said floor, said second side wall panel substantially covering said second side wall below said overhang, said second side wall panel further having a plurality of spaced apart and vertically oriented second grooves, said second grooves being dimensioned to permit a second end of said retaining member to be inserted thereinto, said second grooves being displaced a small distance downwardly from said overhang and extend to a location adjacent to and spaced above said floor panel, said small distance being selected to permit said second end of said retaining member to be inserted into a selected one of said second grooves under said overhang; and
   means for attaching said floor panel to said floor, said front wall panel to said front wall, said rear wall panel to said rear wall, said first side wall panel to said first side wall under said overhang and said second side wall panel to said second side wall under said overhang.

2. The multi-piece bed liner of claim 1, wherein said first and second grooves are dimensioned to permit said first and second ends of said transversely orientable retaining member to be vertically inserted thereinto.

3. The multi-piece bed liner of claim 1 wherein said means for attaching is selectively releasable.

4. The multi-piece bed liner of claim 1 wherein said front wall panel has a plurality of third grooves; and wherein said rear panel has a plurality of fourth grooves, each groove of said third grooves facing a groove of said fourth grooves; whereby at least one longitudinally orientable retaining member may be inserted into and between selected ones of said third and fourth grooves so as to extend longitudinally in said bed and selectively retain said objects in said bed at predetermined locations therein.

5. The multi-piece bed liner of claim 4, wherein each of said transversely orientable retaining member and said longitudinally orientable retaining member is constructed of a standard width wooden structural building material.

6. A multiple-piece cargo restrainable liner for a bed of a pick-up truck, said bed having a floor, a first side wall and a second side wall opposite said first side wall, said first and second side walls having a bottom adjacent to said floor, a top, and an overhang extending inwardly from said top, said overhang having an underside facing said floor, said first and second side walls having a predetermined height between said bottom and said underside of said overhang, said cargo restrainable wall liner comprising:

a first side wall panel for lining said first side wall of said bed, said first side wall panel having a top edge adjacent to said underside of said overhang and a bottom edge adjacent to said floor, said first side wall panel substantially covering said first side wall, said first side wall panel having a plurality of spaced apart, vertically oriented first grooves extending from a predetermined location displaced downward from said overhang toward said floor a distance sufficient to permit the insertion of at least one transversely orientable retaining member into a selected one of said first grooves below said overhang, said first grooves terminating a short distance above said floor to provide a clearance for a floor liner panel;

a second side wall panel for lining said second side wall of said bed, said second side wall panel having a top edge adjacent to said underside of said overhang and a bottom edge adjacent to said floor, said second side wall panel substantially covering said second side wall, said second side wall panel having a plurality of spaced apart, vertically oriented second grooves, said vertically oriented second grooves extending from a predetermined location displaced downward from said overhang toward said floor a distance to permit said at least one transversely orientable retaining member to be inserted into a selected one of said second grooves below said overhang, said second grooves terminating a short distance above aid floor to provide a clearance for a floor liner panel;

said at least one transversely orientable retaining member having a length a small clearance distance less than a transverse distance between bottoms of said first grooves of said first side wall panel and bottoms of said second grooves of said second side wall panel, said at least one transversely orientable retaining member having a first end insertable into a selected one of said first grooves and a second end insertable into a selected one of said second grooves; and means for attaching said first side wall panel directly to said first side wall below said overhang and said second side wall panel directly to said second side wall below said overhang.

7. The multi-piece cargo restrainable liner of claim 6 wherein said first and second grooves are dimensioned to permit said first and second ends of said at least one transversely orientable retaining member to be vertically inserted thereinto.

8. The multi-piece cargo restrainable liner of claim 7 wherein said bed has a front wall, said multi-piece cargo restrainable liner further comprising:

a front wall panel for lining said front wall of said bed;

a floor panel for lining said floor of said bed; and means for attaching said front wall panel to said front wall of said bed and for attaching said floor panel to said floor of said bed.

9. The multi-piece cargo restrainable liner of claim 8 wherein said bed has a rear wall, said multi-piece bed liner further comprising:

a rear wall panel for lining said rear wall of said bed; and means for attaching said rear wall panel to said rear wall of said bed.

10. The multi-piece cargo restrainable liner of claim 9 further comprising at least one longitudinally orientable retaining member having a first end and a second end; wherein said front wall panel has a plurality of third grooves; and wherein said rear panel has a plurality of fourth grooves, each groove of said third grooves facing a groove of said fourth grooves; whereby said first end and said second end of said at least one longitudinally orientable retaining member is inserted into and between selected ones of said third and fourth grooves so as to extend longitudinally in said bed and selectively retain said objects in said bed at a predetermined location therein.

11. The multi-piece cargo restrainable liner of claim 10, wherein each of said at least one transversely orientable retaining member and said at least one longitudinally orientable retaining member is constructed of a standard width wooden structural building material.

12. The multi-piece cargo restrainable liner of claim 9 wherein said means for attaching said side wall panels; means for attaching said front wall panel, and means for attaching said rear wall panel are selectively releasable.

* * * * *